Sept. 20, 1966   E. H. SCOTT   3,273,437
SAW CLAMP ATTACHMENT
Filed Oct. 19, 1964

INVENTOR.
Earl H. Scott 3,273,437
SAW CLAMP ATTACHMENT
Earl H. Scott, Freemansburg, Pa., assignor, by mesne assignments, to Bethlehem Steel Corporation, a corporation of Delaware
Filed Oct. 19, 1964, Ser. No. 404,872
1 Claim. (Cl. 83—444)

This invention relates in general to clamps, and more particularly to a clamp for restraining bars or like workpieces during a cutting operation.

In continuous mills for the manufacture of metal workpieces, such as bars, rods and pipe, the workpieces advance at high speeds, and usually while very hot.

The usual type of cutting machine for this purpose is a so-called flying hot saw, which generally comprises a vertical rotary blade on a carriage which travels horizontally alongside the bar or other workpiece at the same forward speed as the bar as it is being cut.

Such hot saws are conventionally provided with clamps on each side of the saw blade. After a bar is in the desired position, the upper jaw member of each clamp descends to hold the bar in place on the lower jaw member of the clamp while the saw blade is passing through the bar.

However, operating speeds have been increasing, and it has been found that the exitsing clamps will not hold the bars securely at the higher speeds. As the swiftly revolving saw is fed in to cut the bars, the bars are often pushed away, resulting in irregular cuts, heavy burrs, mushrooming, and in many cases, bending of the bars, so that additional operations of hand dressing and straightening the bars become necessary. Occasionally the saw will push a bar completely clear of a clamp, so that a man must be stationed at the saw to open the clamp and push the bar back manually. Saw blade life is also drastically lessened by these conditions.

One object of my invention, therefore, is to provide simple and positive means as an attachment to existing bar clamps on a hot saw to increase the holding effectiveness of such clamps.

Another object is to increase the production of commercially usable cut sections by saving such sections which might otherwise be damaged, and by preventing mill stoppages due to badly bent pieces.

Additional objects, purposes and advantages of the invention will appear hereinafter in this specification and in the appended claim.

In order that my invention may be more readily understood, I shall now refer to the drawing hereto annexed and in which like characters of reference indicate like parts.

Figure 1:
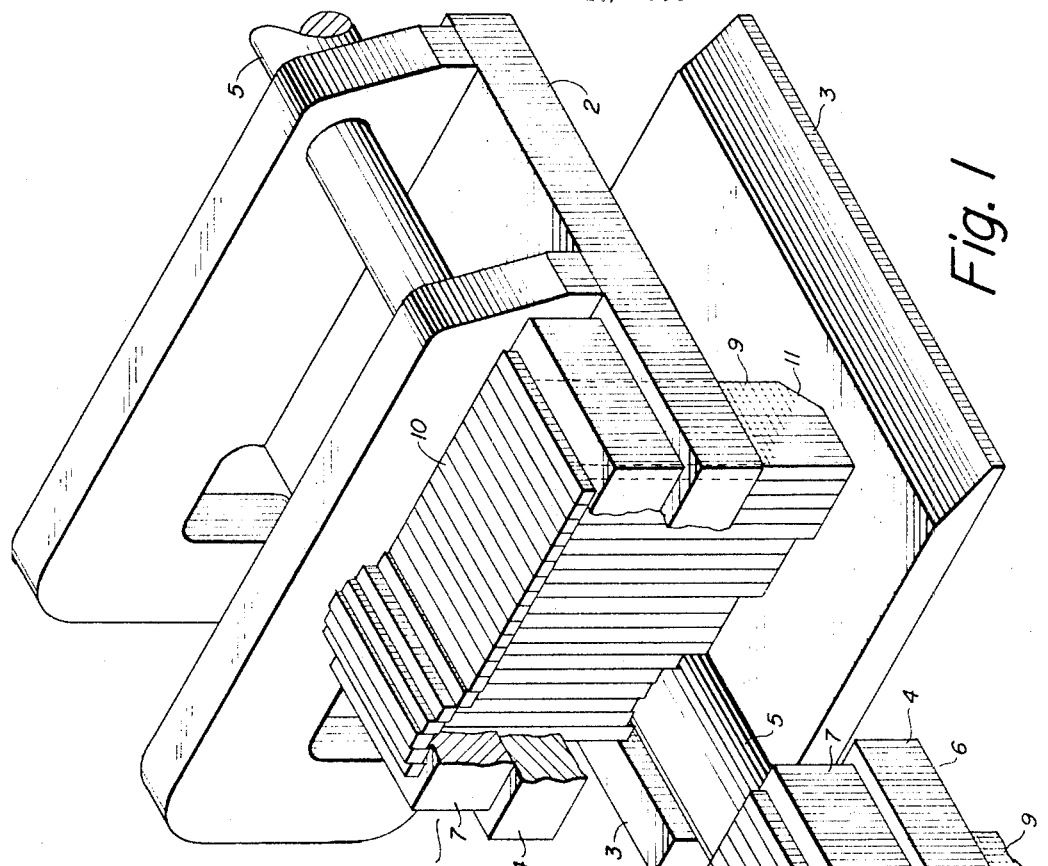
FIGURE 1 is a perspective view illustrating a laterally movable rotary blade and associated clamp members on which are mounted the attachment of my invention.

As shown in FIG. 1, the reference numeral 1 designates the revolving saw blades, with conventional clamping means comprising upper and lower flat plate jaw members 2 and 3. The upper jaw member 2 has integral and outwardly extending bottom side flanges 4, and is vertically reciprocable by conventional fluid pressure cylinders and lever arms (not shown) to and from the upper face of the lower jaw member 3, which provides support for the round bar 5 during the cutting operation.

My invention, as shown in the drawings, is an attachment which is mounted on one side of each of said upper jaw members 2, and additionally holds the bar 5 firmly fixed in position while it is being cut by the saw blade 1.

Figure 2:
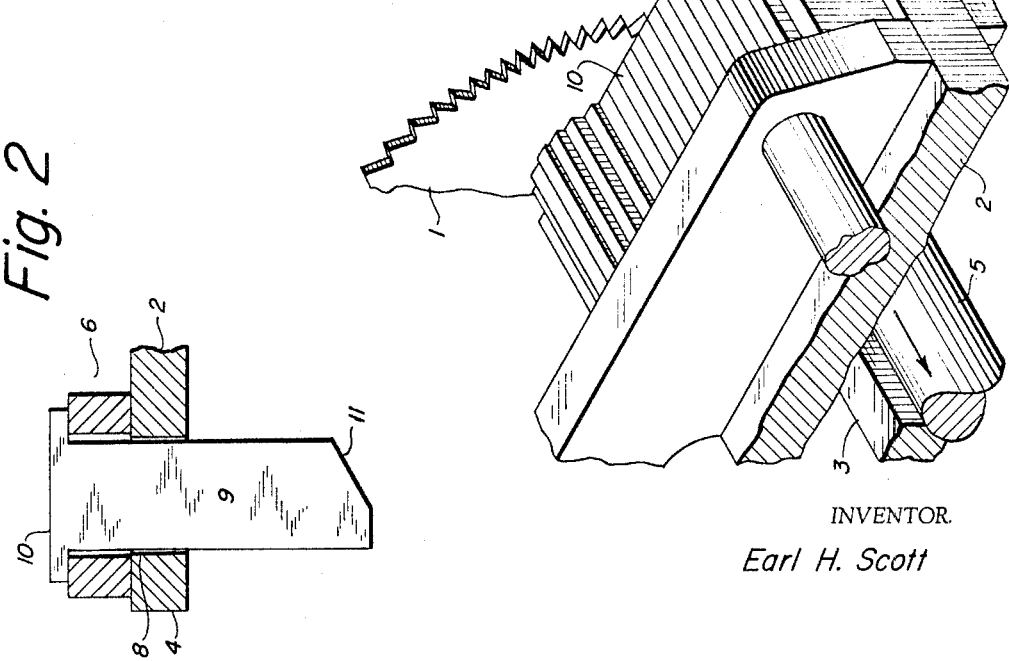
FIGURE 2 is an elevation of a T-block of my invention with the supporting framework in section.

Referring further to FIGS. 1 and 2, said attachment comprises an open rectangular box-shaped holder 6 having upright walls 7 of flat steel plates welded together, and seated above a slightly smaller slot 8 in one of the bottom side flanges 4. Suspended loosely in said holder 6 and extending downwardly through said slot 8 is a series of flat steel T-blocks 9, each of which is supported in the holder 6 by an integral head portion 10. Said blocks 9 are mounted in groups of outwardly increasing lengths and function as bar-engaging fingers. During the cutting operation on the bar 5, traveling in the forward direction indicated by arrow, the fingers directly over the bar are lifted by the bar, and those fingers beyond the bar extend to below its center and conform to the bar closely as it is being cut. The bar is thereby held in place and is kept from being shoved or rolled out of position by the saw blade.

The lower corner of each finger on the side from which the bars are being advanced may be beveled or ground away at an angle, as shown at 11, in order to lessen any possibility of marking the surface of the workpiece.

Although I have shown and described my invention is considerable detail, I do not desire to be limited narrowly to the exact construction shown and described, but I may also use such substitutions, modifications or equivalents thereof as are embraced within the scope of the invention, or as are pointed out in the appended claim.

I claim:

The combination comprising:
(a) a vertical rotary saw blade for sequentially cutting continuously horizontally advancing elongated hot metal workpieces,
(b) a clamp for said workpieces having upper and lower jaw members including flat horizontal clamping surfaces adjacent said blade,
(c) an open rectangular box-like holder mounted beside said upper jaw member, and
(d) a plurality of contiguous flat-sided T-blocks mounted in contacting side by side relationship and freely slidable vertically with respect to one another in said holder and having flat lower ends generally conforming to and engaging the upper and side surface of each workpiece as it rests on the lower jaw member while the workpiece is being cut, thereby holding the workpiece securely against lateral movement and obviating deformation of the workpiece during the cutting operation.

References Cited by the Examiner

UNITED STATES PATENTS

| 1,255,127 | 2/1918 | Baukat | 33—175 |
| 1,938,108 | 12/1933 | Morris | 144—116 |
| 2,614,589 | 10/1952 | Coats et al. | 143—46 |
| 3,108,508 | 10/1963 | Warden | 83—465 |

FOREIGN PATENTS 394,068   6/1933   Great Britain.

WILLIAM W. DYER, Jr., *Primary Examiner.*

L. TAYLOR, *Assistant Examiner.*